United States Patent
Lee

(10) Patent No.: US 9,506,578 B2
(45) Date of Patent: Nov. 29, 2016

(54) PRESSURE REDUCING SOLENOID VALVE

(71) Applicant: HYUNDAI MOBIS CO., LTD., Seoul (KR)

(72) Inventor: Jeonggeol Lee, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 72 days.

(21) Appl. No.: 14/593,761

(22) Filed: Jan. 9, 2015

(65) Prior Publication Data

US 2016/0123322 A1 May 5, 2016

(30) Foreign Application Priority Data

Oct. 30, 2014 (KR) .................. 10-2014-0148989

(51) Int. Cl.
- F16K 31/06 (2006.01)
- F04B 7/00 (2006.01)
- F04B 53/10 (2006.01)

(52) U.S. Cl.
CPC ......... *F16K 31/0651* (2013.01); *F04B 7/0076* (2013.01); *F04B 53/1082* (2013.01); *F16K 31/0658* (2013.01); *F16K 31/0662* (2013.01)

(58) Field of Classification Search
CPC ................... F16K 31/80644; F16K 31/0662; F16K 31/0665
USPC ................................ 251/129.15
See application file for complete search history.

(56) References Cited

U.S. PATENT DOCUMENTS

| 4,427,156 A * | 1/1984 | Bouthors ........... F02M 51/0632 |
| | | 239/488 |
| 5,364,067 A * | 11/1994 | Linkner, Jr. .......... B60T 8/3675 |
| | | 137/454.2 |
| 5,605,317 A * | 2/1997 | Mealy ................. F16K 31/0651 |
| | | 251/129.01 |
| 5,645,325 A | 7/1997 | Mueller et al. |
| 5,681,098 A * | 10/1997 | Ganzel .................... B60T 8/363 |
| | | 251/129.15 |
| 5,725,288 A * | 3/1998 | Fuller .................... B60T 8/5037 |
| | | 303/116.1 |
| 6,439,265 B1 * | 8/2002 | Gruschwitz ............. B60T 8/363 |
| | | 137/601.14 |
| 6,471,305 B1 * | 10/2002 | Leventhal ............... B60T 8/363 |
| | | 251/120 |
| 6,994,406 B1 * | 2/2006 | Krawczyk ............... B60T 8/363 |
| | | 251/129.02 |
| 7,106,158 B2 * | 9/2006 | Forsythe ............. F16K 31/0655 |
| | | 251/129.15 |
| 7,165,754 B2 * | 1/2007 | Trautmann ................ B60T 8/36 |
| | | 137/242 |
| 7,673,847 B2 * | 3/2010 | Suzuki ................ F16K 31/0655 |
| | | 251/129.08 |

(Continued)

FOREIGN PATENT DOCUMENTS

JP 10-76927 A 3/1998
KR 10-2011-0061693 A 6/2011

(Continued)

*Primary Examiner* — Marina Tietjen
*Assistant Examiner* — Seth W MacKay-Smith

(57) ABSTRACT

A pressure reducing solenoid valve according to an exemplary embodiment of the present invention includes: a pump housing which has an inflow path and an outflow path; a coil which is provided at an upper side of the pump housing; and a pressure reducing operating unit which has an upper portion positioned in the coil, and a lower portion positioned in the pump housing, and allows a fluid to be discharged from the inflow path to the outflow path so as to reduce pressure.

13 Claims, 4 Drawing Sheets

(56) References Cited

U.S. PATENT DOCUMENTS

| | | | | |
|---|---|---|---|---|
| 8,006,951 B2* | 8/2011 | Guggenmos | ............ | B60T 8/363 251/129.02 |
| 8,651,453 B2* | 2/2014 | Heyer | ............ | B60T 8/363 251/129.02 |
| 8,979,067 B2* | 3/2015 | Dinerman | ............ | B60T 8/3615 138/44 |
| 9,163,746 B2* | 10/2015 | Voss | ............ | F16K 31/0658 |
| 2005/0173979 A1* | 8/2005 | Voss | ............ | B60T 8/363 303/119.2 |
| 2010/0051839 A1* | 3/2010 | Guggenmos | ............ | F16K 31/0665 251/129.02 |
| 2010/0111734 A1* | 5/2010 | Usui | ............ | F02M 59/366 417/505 |
| 2010/0187457 A1* | 7/2010 | Kratzer | ............ | B60T 8/363 251/129.15 |
| 2011/0147624 A1* | 6/2011 | Schepp | ............ | B60T 8/363 251/65 |
| 2011/0198522 A1* | 8/2011 | Ambrosi | ............ | B60T 8/363 251/129.15 |
| 2013/0161545 A1* | 6/2013 | Leventhal | ............ | B60T 8/363 251/129.15 |
| 2015/0130265 A1* | 5/2015 | Leventhal | ............ | F16K 31/0696 303/10 |

FOREIGN PATENT DOCUMENTS

| | | |
|---|---|---|
| KR | 10-2011-0114903 A | 10/2011 |
| KR | 10-2012-0067620 A | 6/2012 |

* cited by examiner

PRESSURE REDUCING SOLENOID VALVE

CROSS-REFERENCE TO RELATED APPLICATIONS

This application claims priority to and the benefit of Korean Patent Application No. 10-2014-0148989 filed in the Korean Intellectual Property Office on Oct. 30, 2014, the entire contents of which are incorporated herein by reference.

TECHNICAL FIELD

The present invention relates to a pressure reducing solenoid valve which may linearly reduce pressure while still adopting the layout of the existing pump housing.

BACKGROUND ART

In general, an anti-lock brake system (ABS) is a special brake that has been developed to prevent wheels from being locked at the time of quickly braking of a vehicle. The ABS continuously applies increased pressure and reduced pressure to the wheels, thereby providing stable braking and steering performance by preventing the vehicle from slipping at the time of braking. When describing an operational mechanism of the existing pressure reducing solenoid valve for increasing and reducing pressure of the ABS, high pressure is applied to a wheel cylinder side, and a plunger and a seat come into close contact with each other by hydraulic force and spring force that push down the plunger, such that oil cannot flow from the wheel cylinder side to an accumulator side. In this state, when an electrical signal is applied to a coil in order to reduce pressure, the plunger is moved upward by electromagnetic force, such that the plunger and the seat are moved away from each other. Accordingly, the oil passes through a portion between the plunger and the seat from the wheel cylinder side, and then flows toward the accumulator side. Therefore, high pressure at the wheel cylinder side is reduced, and pressure at the vehicle wheel side is reduced, thereby unlocking the brake.

In contrast, at normal times, hydraulic pressure is applied to the wheel cylinder side, and the plunger and the seat come into close contact with each other by hydraulic force and spring force that push down the plunger, such that the oil does not flow from the wheel cylinder side to the accumulator side.

Subsequently, in the case of the existing pressure reducing solenoid valve, when a direction of electromagnetic force, which is generated when an electrical signal is applied to the coil, is opposite to a direction of hydraulic force, it is impossible to accurately control pressure of the wheel, such that an operation of reducing pressure is performed in an on-off control manner.

Therefore, there is a problem in that noise is generated at the time of controlling the ABS or an ESC, and a brake pedal is not normally operated, such that comfort of the vehicle deteriorates. As described above, the existing pressure valve has a limitation in satisfying needs for a urban smart cruise control (SCC) for the vehicle and the implementation of additional functions using various low pressure.

For example, Korean Patent Application Laid-Open No. 10-2011-0061693 discloses "Solenoid Valve Assembly for Preventing Drive-Slip of Vehicle".

SUMMARY OF THE INVENTION

The present invention has been made in an effort to provide a pressure reducing solenoid valve which may linearly reduce pressure while still adopting the layout of the existing pump housing.

An exemplary embodiment of the present invention provides a pressure reducing solenoid valve including: a pump housing which has an inflow path and an outflow path; a coil which is provided at an upper side of the pump housing; and a pressure reducing operating unit which has an upper portion positioned in the coil, and a lower portion positioned in the pump housing, and allows a fluid to be discharged from the inflow path to the outflow path so as to reduce pressure.

The pressure reducing operating unit may include: an outer sleeve which surrounds an inner sleeve, and is provided in the coil; the inner sleeve which is provided in the outer sleeve; a plunger which is provided in the inner sleeve, and moved downward by electromagnetic force that is generated when an electric current is applied to the coil; and a stator which is positioned below the plunger, has an upper portion disposed in the inner sleeve, and a lower portion disposed in the pump housing, and provides a flow path through which the fluid flows from the inflow path to the outflow path.

The inner sleeve may be disposed in the outer sleeve so as to be spaced apart from the outer sleeve at an interval so that a guide flow path through which the fluid passes is provided.

The inner sleeve may have a through hole at an upper portion thereof so that the fluid flows into the inner sleeve.

An opening and closing member, which opens and closes a through hole provided in an upper portion of the inner sleeve, may be provided on an upper portion of the plunger.

The opening and closing member may have a ball shape.

A side hole may be provided in a middle portion of the stator so that the fluid flowing into the inflow path flows to a through hole of the inner sleeve.

A center hole, which forms a flow path connected to the outflow path so that the fluid passing through a through hole provided in an upper portion of the inner sleeve flows to the outflow path, may be provided in the stator.

A bottom surface of the plunger and an upper surface of the stator may be disposed to be spaced apart from each other at an interval.

An elastic member, which pushes up the plunger, may be provided between the plunger and the stator.

The elastic member may be a spring.

A stepped portion may be formed along an upper surface of the stator.

A non-magnetic member may be positioned between the plunger and the stator.

The pressure reducing solenoid valve according to the exemplary embodiment of the present invention may linearly reduce pressure while still adopting the layout of the existing pump housing.

Driving stability may be ensured.

Excellent noise performance, smooth ABS control, and pedal comfort may be provided.

A braking distance may be reduced.

Stability of a vehicle may be ensured when performing a smart cruise control (SCC).

Various types of additional functions may be easily controlled.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
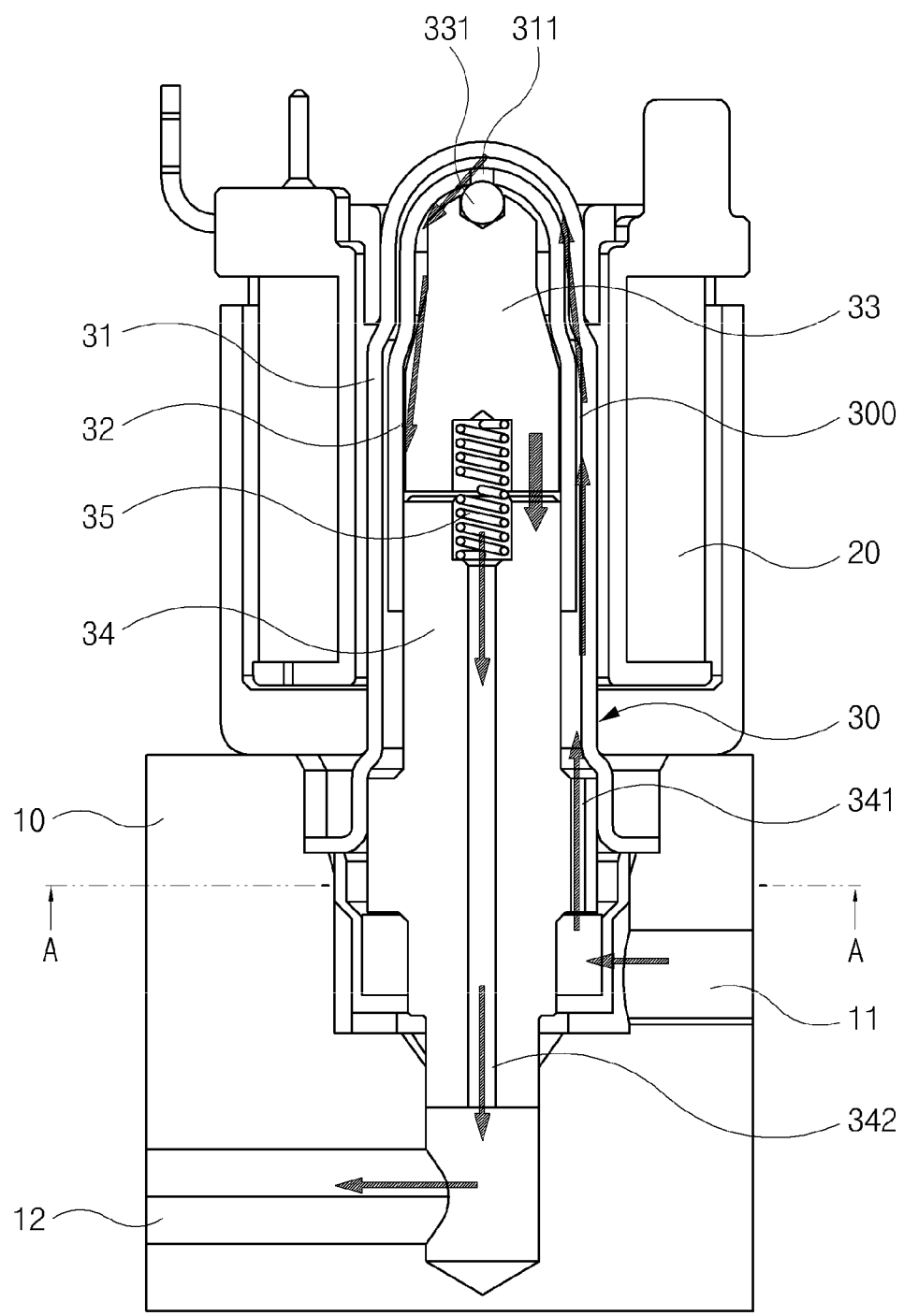
FIG. 1 is an overall configuration view of a pressure reducing solenoid valve according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an exemplary embodiment of the present invention will be described in detail with reference to the accompanying drawings. First, in denoting reference numerals to constituent elements of respective drawings, it should be noted that the same constituent elements will be designated by the same reference numerals although they are shown in different drawings. Hereinafter, an exemplary embodiment of the present invention will be described, but it is obvious that the technical spirit of the present invention is not restricted or limited thereto, but the exemplary embodiment of the present invention may be modified by a person with ordinary skill in the art to be variously carried out.

First, a configuration of a pressure reducing solenoid valve according to an exemplary embodiment of the present invention will be described.

Figure 2:
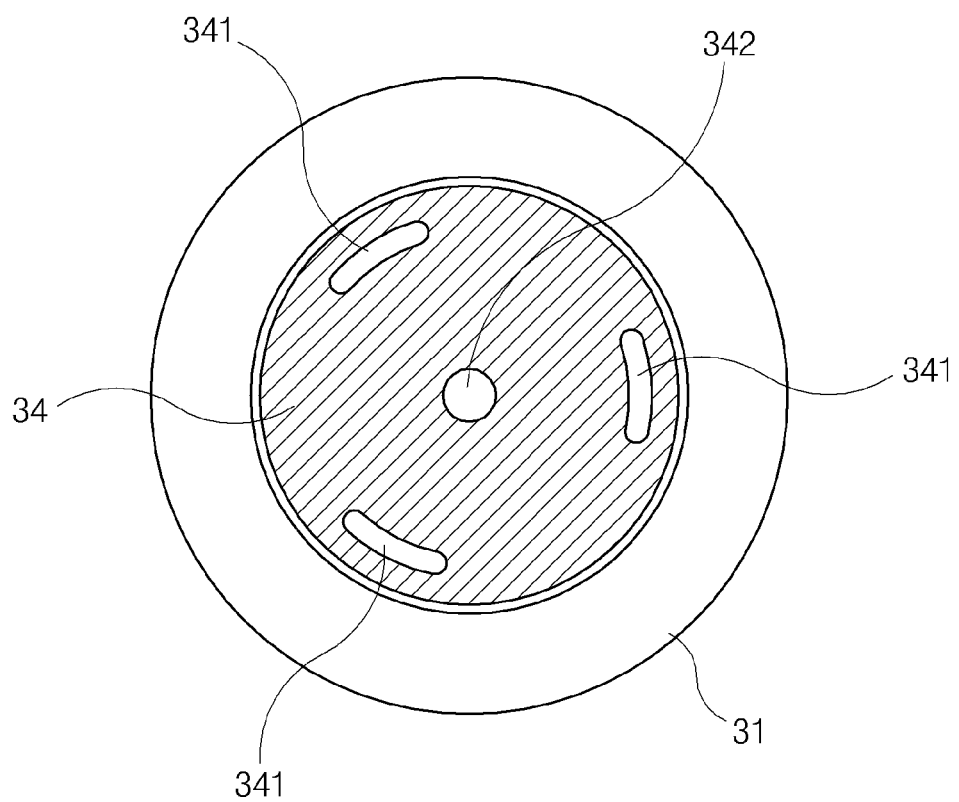
FIG. 2 is a cross-sectional view taken along line A-A of FIG. 1.

As illustrated in FIGS. 1 and 2, the pressure reducing solenoid valve includes a pump housing 10 which has an inflow path 11 and an outflow path 12 so as to allow a fluid such as brake oil to flow therethrough, a coil 20 which is provided at an upper side of the pump housing 10, and a pressure reducing operating unit 30 which has an upper portion positioned in the coil 20, and a lower portion positioned in the pump housing 10 so as to reduce pressure by moving the fluid.

Specifically, the pump housing 10 has therein the inflow path 11 through which the fluid such as brake oil flows in, and the outflow path 12 through which the fluid is discharged. The inflow path 11 is a wheel cylinder side flow path, and the outflow path 12 is an accumulator side flow path.

The coil 20 is disposed at the upper side of the pump housing 10. When an electric current is applied to the coil 20 at the time of reducing pressure, electromagnetic force is generated, and a plunger 33 is moved downward by the electromagnetic force. A through hole 311 of an inner sleeve 32 is opened so that the fluid may flow into the through hole 311 as the plunger 33 is moved downward.

The pressure reducing operating unit 30 has a structure that may linearly reduce pressure. The pressure reducing operating unit 30 includes an outer sleeve 31 which is provided in the coil 20, the inner sleeve 32 which is provided in the outer sleeve 31, the plunger 33 which is moved downward and upward in the inner sleeve 32, a stator 34 which has side holes 341 and a center hole 342 through which the fluid may flow, and an elastic member 35 which is provided between the plunger 33 and the stator 34.

Specifically, the outer sleeve 31 is provided in the coil 20. That is, an upper portion of the outer sleeve 31 is positioned in the coil 20, and a lower portion of the outer sleeve 31 is positioned in the pump housing 10. An upper end of the outer sleeve 31 may be formed as a curved surface so that the fluid may smoothly flow. The lower portion of the outer sleeve 31 is opened so as to communicate with the interior of the outer sleeve 31.

The inner sleeve 32 is inserted into the outer sleeve 31 through the opened lower portion of the outer sleeve 31. An upper portion of the inner sleeve 32 is formed in a shape that conforms to a shape of the upper portion of the outer sleeve 31. For example, in a case in which the inside upper portion of the outer sleeve 31 has a curved surface, the upper portion of the inner sleeve 32 may also be formed to have a curved surface. The through hole 311 is formed in the upper portion of the inner sleeve 32. When reducing pressure, the fluid flows into the inner sleeve 32 through the through hole 311. The inner sleeve 32 is coupled in the outer sleeve 31 so as to be spaced apart from the outer sleeve 31 at a predetermined interval so that a guide flow path 300 through which the fluid may pass may be provided. The plunger 33 is coupled in the inner sleeve 32. The plunger 33 is moved downward and upward in the inner sleeve 32. The plunger 33 is moved downward toward the stator 34 by electromagnetic force that is generated when an electric current is applied to the coil 20. An upper portion of the plunger 33 is formed to have an external shape that conforms to the shape of the inside upper portion of the inner sleeve 32. An opening and closing member 331, which opens and closes the through hole 311 of the inner sleeve 32, is provided at an upper end of the inner sleeve 32. The opening and closing member 331 may have a ball shape.

Figure 3:
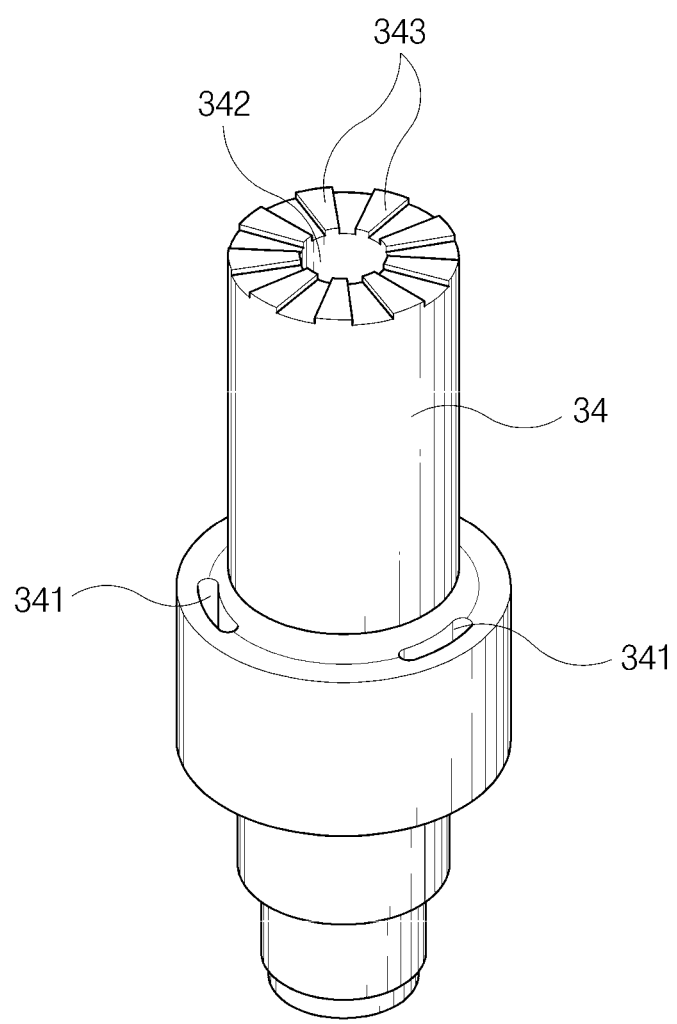
FIG. 3 is an enlarged view of a stator according to the exemplary embodiment of the present invention.

As illustrated in FIG. 3, the stator 34 is disposed below the plunger 33. An upper surface of the stator 34 is spaced apart from a bottom surface of the plunger 33 at a predetermined interval so that the plunger 33 may be moved downward. An upper portion of the stator 34 is positioned at a lower side in the inner sleeve 32 so that the upper portion of the stator 34 is positioned below the plunger 33. A lower portion of the stator 34 is coupled in the pump housing 10.

The plurality of side holes 341 is provided in an approximately middle portion of the stator 34. Of course, the middle portion of the stator 34 is formed to have a greater diameter than the upper and lower portions of the stator 34 so as to form the side holes 341.

The fluid, which has flown into the inflow path 11, may flow toward the outflow path 12 through the side holes 341. The center hole 342 is formed at a center of the stator 34. The center hole 342 forms a flow path connected to the outflow path 12 so that the fluid may flow toward the outflow path 12. The fluid, which has passed through the through hole 311 of the inner sleeve 32, flows toward the outflow path 12 through the center hole 342.

Meanwhile, stepped portions 343 are radially formed on an upper surface of the stator 34 at a predetermined interval. The fluid flows to the center hole 342 via a space between the stepped portions 343 and the stepped portions 343 in a state in which the bottom surface of the plunger 33 is in close contact with the upper surface of the stator 34.

Although not illustrated in the drawings, a non-magnetic member may be positioned between the plunger 33 and the stator 34.

As described above, the stepped portions 343 are formed on the upper surface of the stator 34 or the non-magnetic member is provided between the plunger 33 and the stator 34, thereby preventing the plunger 33 from being still attached to the stator for a short time due to hysteresis deviation even though the stator needs to return back by a spring immediately when electric power applied to the coil is shut off after the stator is operated.

The elastic member 35 is provided between the plunger 33 and the stator 34. The elastic member 35 may be a spring. The elastic member 35 pushes up the plunger 33 so as to allow the opening and closing member 331 to come into close contact with the through hole 311. In a state in which the opening and closing member 331 is in close contact with the through hole 311, the fluid may not flow into the inner sleeve 32.

When the plunger 33 is moved downward by electromagnetic force that is generated when an electric current is applied to the coil 20 at the time of reducing pressure, the opening and closing member 331, which has been in close contact with the through hole 311, is also simultaneously moved downward, thereby opening the through hole 311. In a state in which the through hole 311 is opened, the fluid may flow into the inner sleeve 32 through the through hole 311. In order to support upper and lower sides of the elastic member 35, supporting holes may be provided in the bottom surface of the plunger 33 and the upper surface of the stator 34.

Meanwhile, a portion of the configuration of the pressure reducing solenoid valve according to the exemplary embodiment of the present invention except for the flow paths of the fluid is a sealing structure.

Figure 4:
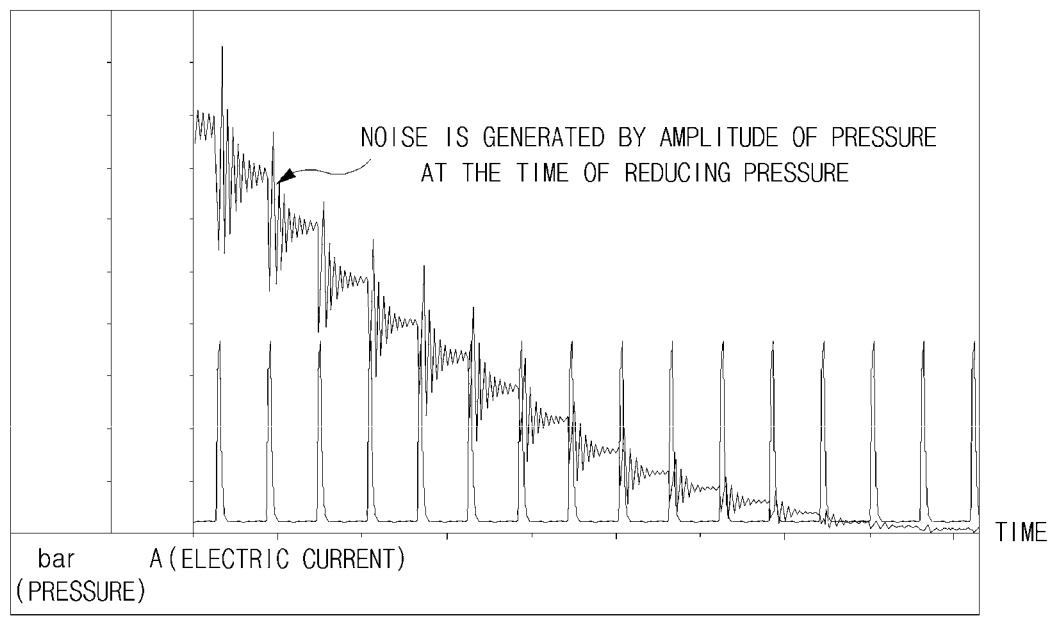
FIG. 4 is a graph illustrating performance of the existing on-off type pressure reducing solenoid valve.
Figure 5:
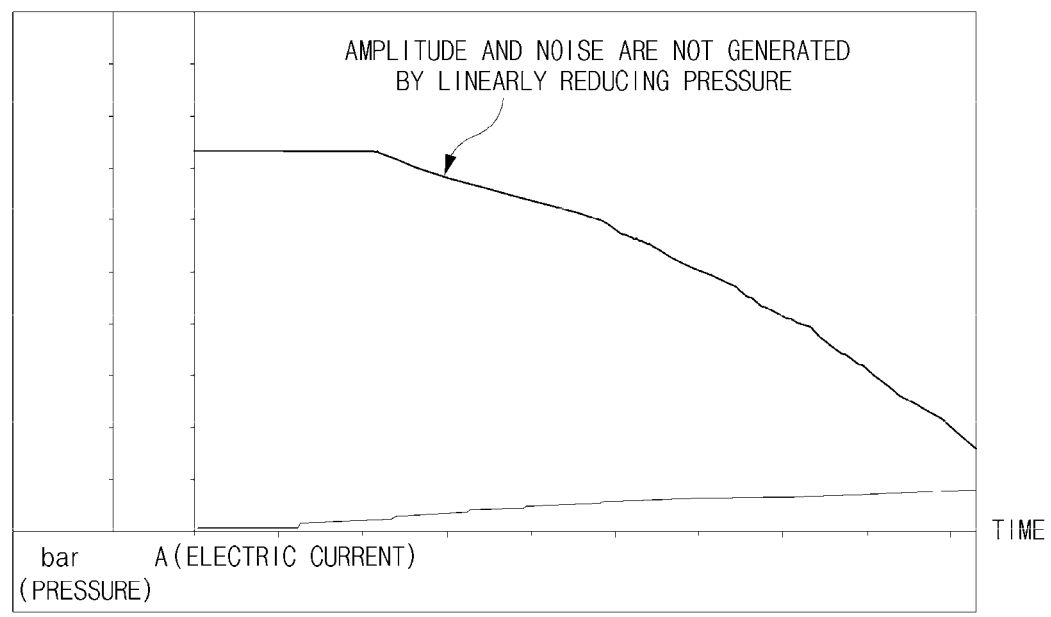
FIG. 5 is a graph illustrating a pressure reducing performance according to the exemplary embodiment of the present invention.

FIG. 4 is a graph illustrating performance of the existing on-off type pressure reducing solenoid valve, and FIG. 5 is a graph illustrating pressure reducing performance according to the exemplary embodiment of the present invention.

It can be seen from the graph of FIG. 4 that noise is generated in the existing on-off type pressure reducing solenoid valve due to amplitude at the time of reducing pressure. It can be seen from the graph of FIG. 5 that amplitude and noise are not generated in the pressure reducing solenoid valve according to the exemplary embodiment of the present invention by linearly reducing pressure.

Next, an operation of the pressure reducing solenoid valve according to the exemplary embodiment of the present invention will be described.

As indicated by arrows in FIG. 1, the fluid such as brake oil, which has flown into the inflow path 11 at the wheel cylinder side, is discharged to the outflow path 12 at the accumulator side at the time of reducing pressure.

Specifically, at the time of reducing pressure, the fluid, which has flown into the inflow path 11, flows along the guide flow path 300 formed between the outer sleeve 31 and the inner sleeve 32 via the side holes 341 of the stator 34.

In this case, the plunger 33 is moved downward by electromagnetic force that is generated when an electric current is applied to the coil 20. Therefore, the opening and closing member 331, which has closed the through hole 311 provided in the inner sleeve 32, is moved away from the through hole 311, thereby opening the through hole 311.

The fluid, which has passed through the guide flow path 300, flows into the inner sleeve 32 through the through hole 311 in an opened state. The fluid, which has flown into the inner sleeve 32, flow toward the center hole 342 through the spaces between the stepped portions 343 and the stepped portions 343 in a state in which the bottom surface of the plunger 33 and the upper surface of the stator 34 are in close contact with each other as the plunger 33 is moved downward. The fluid, which has passed through the center hole 342, is discharged through the outflow path 12 that forms a flow path connected to the center hole 342.

In brief summary, the fluid sequentially passes through the inflow path 11, the side holes 341, the guide flow path 300, the through hole 311, and the center hole 342, and then is discharged through the outflow path 12.

Meanwhile, in a state in which an electric current is not applied to the coil 20 before reducing pressure, the plunger 33 is moved upward by elastic force of the elastic member 35, and the opening and closing member 331 closes the through hole 311, such that the fluid may not flow to the outflow path 12.

As described above, the pressure reducing solenoid valve according to the exemplary embodiment of the present invention may linearly reduce pressure while still adopting the layout of the existing pump housing.

The pressure reducing solenoid valve according to the exemplary embodiment of the present invention may conform to a current tendency of a wheel low-pressure control technology which requires stability, steering performance, vibration and noise reduction, and the like. The present invention may ensure driving stability, and may provide excellent noise performance, smooth ABS control, and pedal comfort. An effect of reducing a braking distance may be expected, stability of a vehicle may be ensured when performing a smart cruise control (SCC), and various types of additional functions may be easily controlled. The layout of the existing pump housing may be still adopted, thereby reducing manufacturing costs.

The pressure reducing solenoid valve according to the exemplary embodiment of the present invention may be applied even to a regenerative braking system, thereby improving NVH (noise, vibration, and harshness) performance of the regenerative braking system.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A pressure reducing solenoid valve comprising:
a pump housing which has an inflow path and an outflow path;
a coil which is provided at an upper side of the pump housing; and
a pressure reducing operating unit which has an upper portion positioned in the coil, and a lower portion positioned in the pump housing, and allows a fluid to be discharged from the inflow path to the outflow path so as to reduce pressure,
wherein the pressure reducing operating unit includes:
an outer sleeve which surrounds an inner sleeve, and is provided in the coil;
the inner sleeve which is provided in the outer sleeve;
a plunger which is provided in the inner sleeve, and moved downward by electromagnetic force that is generated when an electric current is applied to the coil; and
a stator which is positioned below the plunger, has an upper portion disposed in the inner sleeve, and a lower portion disposed in the pump housing, and provides a flow path through which the fluid flows from the inflow path to the outflow path, and
wherein an opening and closing member, which opens and closes a through hole provided in an upper portion of the inner sleeve, is provided on an upper portion of the plunger.

2. The pressure reducing solenoid valve of claim 1, wherein an outer surface of the inner sleeve is spaced apart from an inner surface of the outer sleeve at an interval to provide a guide flow path through which the fluid passes.

3. The pressure reducing solenoid valve of claim 1, wherein the inner sleeve has a through hole at an upper portion thereof so that the fluid flows into the inner sleeve.

4. The pressure reducing solenoid valve of claim 1, wherein the opening and closing member has a ball shape.

5. The pressure reducing solenoid valve of claim 1, wherein a side hole is provided in a middle portion of the stator so that the fluid flowing into the inflow path flows to a through hole of the inner sleeve.

6. The pressure reducing solenoid valve of claim 1, wherein a center hole, which forms a flow path connected to the outflow path so that the fluid passing through a through hole provided in an upper portion of the inner sleeve flows to the outflow path, is provided in the stator.

7. The pressure reducing solenoid valve of claim 1, wherein a bottom surface of the plunger and an upper surface of the stator are disposed to be spaced apart from each other at an interval.

8. The pressure reducing solenoid valve of claim 1, wherein an elastic member, which pushes up the plunger, is provided between the plunger and the stator.

9. The pressure reducing solenoid valve of claim 8, wherein the elastic member is a spring.

10. The pressure reducing solenoid valve of claim 1, wherein a stepped portion is formed along an upper surface of the stator.

11. The pressure reducing solenoid valve of claim 1, wherein a non-magnetic member is positioned between the plunger and the stator.

12. A pressure reducing solenoid valve comprising:
a pump housing including an inflow path and an outflow path;
a coil disposed over the pump housing; and
a pressure reducing operating unit including an upper portion and a lower portion, the upper portion being disposed in the coil, the lower portion being disposed in the pump housing, the pressure reducing operating unit allowing a fluid to flow from the inflow path to the outflow path when a current is applied to the coil,
wherein the pressure reducing operating unit includes:
an inner sleeve disposed in the coil and including a through hole, the through hole being disposed in an upper portion of the inner sleeve;
a plunger disposed in the inner sleeve and moving away from the through hole of the inner sleeve when the current is applied to the coil; and
an opening and closing member disposed on an upper portion of the plunger, the opening and closing member opening the through hole of the inner sleeve when the current is applied to the coil and closing the through hole of the inner sleeve when the current is not applied to the coil.

13. The pressure reducing solenoid valve of claim 12, wherein the pressure reducing operating unit further includes:
a stator disposed below the plunger and including a center hole and a side hole, the center hole being connected between a space between the plunger and the stator and the outflow path, the side hole being connected between the inflow path and a guide flow path, and
wherein the fluid flows through the side hole in a first direction and the fluid flows through the center hole in a second direction opposite to the first direction when the current is applied to the coil.

* * * * *